United States Patent [19]

Kiwaki et al.

[11] 4,171,510
[45] Oct. 16, 1979

[54] SYSTEM FOR DETECTING OUTPUT OF CONTROLLABLE SEMICONDUCTOR DEVICE

[75] Inventors: Hisakatsu Kiwaki; Masahiko Ibamoto, both of Katsuta; Masato Suzuki, Hitachi; Jinichi Toyama; Shigeru Kuriyama, both of Katsuta, all of Japan

[73] Assignee: Hitachi, Ltd., Japan

[21] Appl. No.: 844,120

[22] Filed: Oct. 20, 1977

[30] Foreign Application Priority Data

Nov. 4, 1976 [JP] Japan .................. 51-131780

[51] Int. Cl.² .................. H02P 5/16; H02P 5/18
[52] U.S. Cl. .................. 323/89 M; 318/139; 323/22 SC; 330/8
[58] Field of Search .......... 318/139, 246, 341, 345 C; 323/34, 22 SC, 89 R, 89 M; 330/8, 63

[56] References Cited

U.S. PATENT DOCUMENTS

| | | | |
|---|---|---|---|
| 3,413,494 | 11/1968 | Wisman | 323/89 M |
| 3,903,465 | 9/1975 | Ibamoto et al. | 318/139 X |
| 3,914,672 | 10/1975 | Kiwaki et al. | 318/246 |
| 4,032,833 | 6/1977 | Ibamoto et al. | 323/89 M |
| 4,039,866 | 8/1977 | Komuro et al. | 323/34 X |

*Primary Examiner*—A. D. Pellinen
*Attorney, Agent, or Firm*—Craig and Antonelli

[57] ABSTRACT

A system for detecting an output of a controllable semiconductor device includes a controllable semiconductor device, a magnetic amplifier to which an output of the semiconductor device is fedback to control the semiconductor device, and a monitor device for monitoring an output of the magnetic amplifier. The monitor device serves for determining that the output of said semiconductor device exceeds a predetermined level, when the output of the magnetic amplifier is in a remanent output region of the magnetic amplifier.

9 Claims, 9 Drawing Figures

FIG. 5
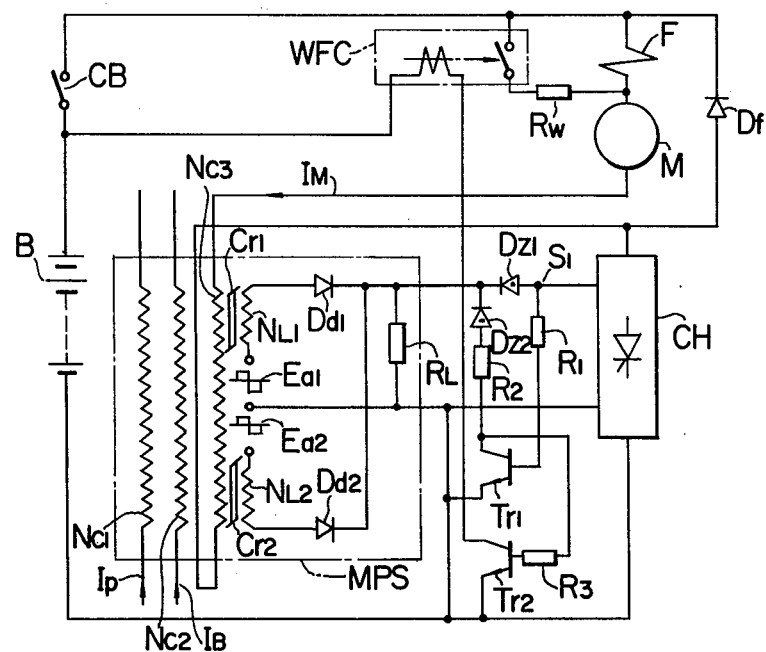
FIG. 6A
FIG. 6B
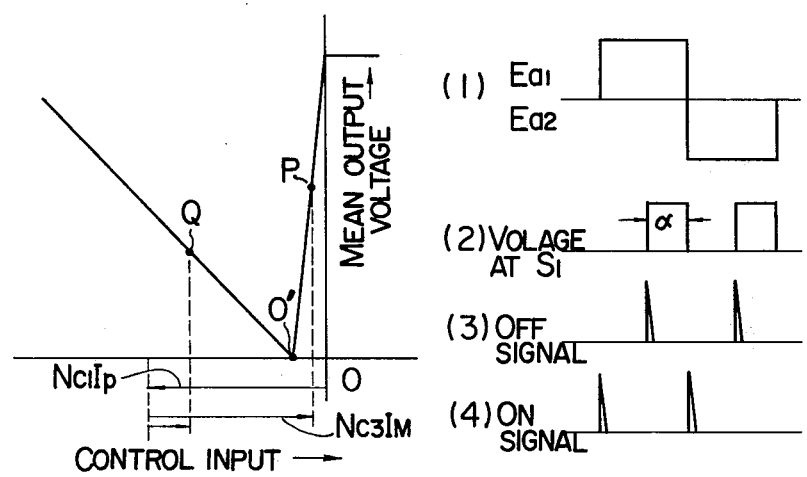

SYSTEM FOR DETECTING OUTPUT OF CONTROLLABLE SEMICONDUCTOR DEVICE

LIST OF PRIOR ART REFERENCES (37 CFR 1.56 (a))

The following reference is cited to show the state of the art:
U.S. Pat. No. 3,914,672; H. Kiwaki et al; Oct. 21, 1975; 318/246; 318/341

BACKGROUND OF THE INVENTION

The present invention relates to a system for detecting an output of a controllable semiconductor device which is controlled by a magnetic amplifier.

A magnetic amplifier or phase shifter generally has various excellent characteristics such as simple and strong structure, the ability of adding and subtracting a plurality of control inputs while they are isolated from each other and amplifying a resultant output for conversion to a phase shift signal, and the ability of adjusting a time constant so as to avoid the effect of noise. Accordingly, the magnetic amplifier has been widely used to control a controllable semiconductor device such as a thyristor device for an electric car or the like.

U.S. Pat. No. 3,914,672 entitled "Chopper Control System" discloses a chopper control system using a magnetic phase shifter or amplifier to operate a D.C. motor of an electric car.

However, since the system disclosed in the U.S. Pat. No. 3,914,672 is not provided with a function to sense an output of the chopper, the equipments cannot be protected when an excess current flows by commutation failure of the chopper. Also, because there is no function to sense the output of the chopper, it is difficult to effect a field-weakening control which is required to accelerate the motor speed.

In order to enable protection against commutation failure, means for sensing the commutation failure is necessary. However, the commutation failure sensing means is generally complex in its circuit configuration and has a low reliability. Further, since it does not always operate in a fail-safe fashion, the commutation failure sensing means only is not sufficient as a protection device and an additional backup protection device such as an overcurrent relay or the like is required.

Also, in order to properly effect a field-weakening control of a motor, it is necessary to provide means for sensing the maximum duty factor of the chopper, and a similar problem to the above is generally involved in this case too.

SUMMARY OF THE INVENTION

It is an object of the present invention to provide a detecting system for readily sensing an output of a controllable semiconductor device, such as a semiconductor switching device, which is controlled by a magnetic amplifier.

A feature of the present invention resides in a system for detecting an output of a controllable semiconductor device including a controllable semiconductor device, a magnetic amplifier which control an output of the controllable semiconductor device and to which an output of the controllable semiconductor device is fedback, and a monitor device for monitoring the output of the magnetic amplifier, which monitor device serves for determining that the output of the semiconductor device exceeds a predetermined level when the output of the magnetic amplifier is in a remanent output region of the magnetic amplifier.

By utilizing the detecting system according to the present invention, for example, the equipment can effectively be protected from an excess current flow by commutation failure of the controllable semiconductor device, and a field-weakening control of a motor controlled by the semiconductor device can properly be carried out.

The above and other objects and features of the present invention will be apparent from the following detailed description of the preferred embodiments of the invention.

BRIEF DESCRIPTION OF THE DRAWINGS

FIG. 5 shows a configuration of another embodiment of the detecting system of the present invention, which is employed for a field-weakening control of a motor.

FIGS. 6A and 6B show charts for explaining the operation of the embodiment shown in FIG. 5.

DESCRIPTION OF THE PREFERRED EMBODIMENTS

Figure 1:
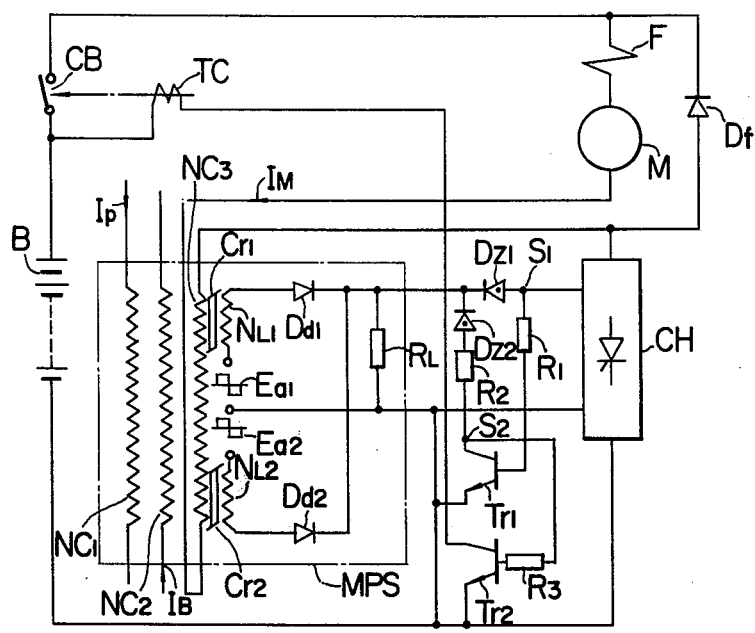
FIG. 1 shows a configuration of one embodiment of the detecting system of the present invention, which is employed for protection to an excess current flow.

FIG. 1 shows a configuration of one embodiment of a system for detecting an output of a controllable semiconductor device of the present invention, in which a magnetic amplifier or phase shifter controls a chopper to operate a D.C. motor. In FIG. 1, B denotes a battery, CB a circuit breaker, M a D.C. motor, F a field thereof, $NC_3$ one of control windings of a magnetic amplifier, Df a free wheel diode and CH a chopper. The D.C. motor M, the field F and the control winding $NC_3$ are connected in series and the free wheel diode Df is connected in parallel with this series circuit. The battery B, the circuit breaker CB and the chopper CH are connected in series with the parallel circuit consisting of the above series circuit and the free wheel diode Df to form a closed circuit. The chopper has such a switching function that it short-circuits thereacross when an ON signal is applied and opens thereacross when an OFF signal is applied. Thus, when the chopper CH is connected between the battery B and the motor M, a D.C. voltage can be intermittently applied to the motor M. By adjusting the ratio of the ON period to one operation cycle of the chopper CH (generally referred to as a duty factor), a mean voltage (and hence a mean current) applied to the motor M can be controlled.

MPS denotes the magnetic amplifier for controlling the chopper CH, i.e. controlling a duty angle of the chopper CH in accordance with a deviation between a command current $I_p$ and a motor current $I_M$. The magnetic amplifier MPS comprises magnetic cores $C_{r1}$ and $C_{r2}$ having square magnetic characteristic, output windings $N_{L1}$ and $N_{L2}$ wound thereon and control windings $N_{C1}$, $N_{C2}$ and $N_{C3}$. The output windings $N_{L1}$ and $N_{L2}$ are excited by square wave A.C. power supplies $E_{a1}$ and $E_{a2}$ and the outputs therefrom are applied to a load resistor $R_L$ through feedback rectifiers $D_{d1}$ and $D_{d2}$.

The command current $I_p$ is supplied to the control winding $N_{C1}$, a bias current $I_B$ is supplied to the control winding $N_{C2}$, and the motor current $I_M$ is supplied to the control widing $N_{C3}$.

Figure 2:
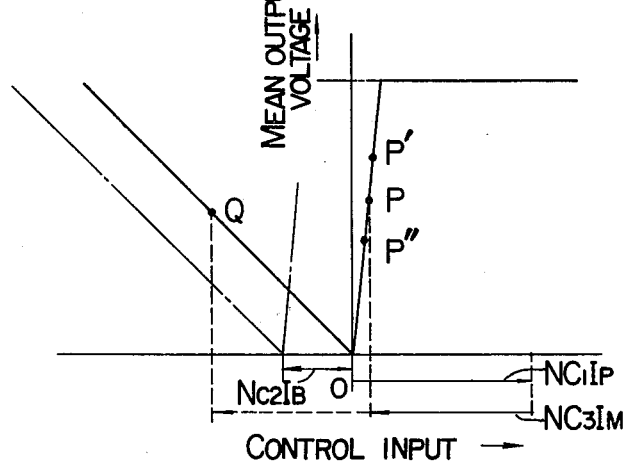
FIG. 2 and FIGS. 3A to 3C show charts for explaining the operation of the embodiment shown in FIG. 1.

FIG. 2 shows a characteristic of the magnetic amplifier MPS, in which an abscissa represents a control input and an ordinate represent a mean output voltage.

The bias current $I_B$ serves to shift the characteristic in the direction of the control input cordinate. FIG. 2 shows an example where the mean output voltage is zero when the control input is zero.

Figure 3A:
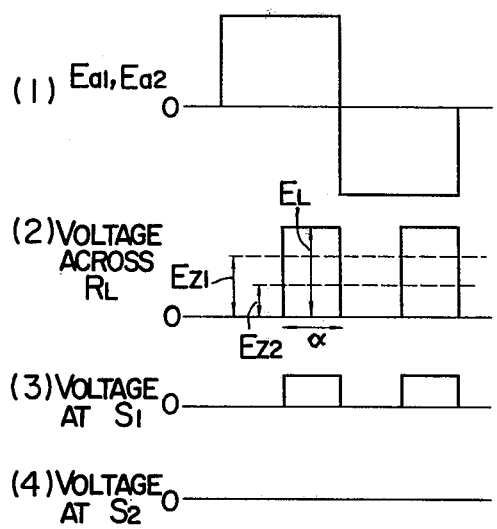

In a positive control input range in FIG. 2, that is, in a normal output region of the magnetic amplifier MPS, the output of the magnetic amplifier MPS always has a constant level $E_L$ as shown in (2) of FIG. 3A, and the output width or the duty angle $\alpha$ changes in accordance with a deviation between the command current $I_P$ and the motor current $I_M$. On the other hand, in a negative control input range, that is, in a remanent output region of the magnetic amplifier MPS, the magnetic amplifier MPS exhibits a current transformer characteristic and the output thereof produces a D.C. voltage a level $E_L$ of which depends on the deviation between the command current $I_P$ and the motor current $I_M$, as shown in (2) of FIG. 3B.

When the voltage across the load resistor $R_L$ is applied to the chopper CH as the duty angle signal (ON signal) and a pulse voltage produced in synchronism with the polarity reversal of the square A.C. wave is applied to the chopper CH as the OFF signal, the chopper CH usually operates at a point P where a command magnetomotive force $N_{C1}·I_P$ provided by the control winding $N_{C1}$ and a feedback magnetomotive force $N_{C3}·I_M$ provided by the control winding $N_{C3}$ are substantially equal except for a control deviation for conduction of the chopper. If, by any reason, the motor current $I_M$ reduces, the operation point moves to a point P' where the duty angle $\alpha$ increases to compensate for the decrease of the motor current $I_M$. Conversely, if the motor current $I_M$ increases, the operation point moves to a point P'' to suppress the increase of the motor current $I_M$. In this manner, the motor current $I_M$ is automatically controlled so that it is proportional to the command current $I_P$.

The basic operation to control the chopper CH by the magnetic amplifier MPS has been described.

A characteristic portion of the invention, that is, that portion which monitors the output of the magnetic amplifier MPS to sense the output of the chopper CH will now be explained.

A monitor device in the preferred embodiment comprises zener diodes $D_{Z1}$, $D_{Z2}$, transistors $T_{r1}$, $T_{r2}$ and resistors $R_1$, $R_2$, and the output of the monitor device is connected to excite a trip coil TC of the circuit breaker CB. The zener voltages $E_{Z1}$ and $E_{Z2}$ of the zener diodes $D_{Z1}$ and $D_{Z2}$ are selected such that they are lower than the voltage $E_L$ normally produced across the load resistor $R_L$ and meet a relation $E_{Z1} > E_{Z2}$, as shown in (2) of FIG. 3A. Thus, the ON signal for the chopper CH, that is, the voltage at a point $S_1$ in FIG. 1 is equal to $E_L - E_{Z1}$, but since the duration thereof is equal to the duration of the voltage $E_L$, it has no effect on the function of the ON signal for the chopper CH.

On the other hand, the collector voltage of the transistor $T_{r1}$, that is, the voltage at a point $S_2$ in FIG. 1 tends to assume $E_L - E_{Z2}$. However, since the voltage $E_L - E_{Z1}$ at the point $S_1$ having the same duration is applied to the transistor $T_{r1}$ to short circuit the transistor $T_{r1}$, the voltage at the point $S_2$ will be zero. Thus, the transistor $T_{r2}$ is opened and the trip coil TC is not energized.

Thus, when the motor current $I_M$ is substantially proportional to the command current $I_P$ and the operation point of the magnetic amplifier MPS is within the normal control range such as at the point P in FIG. 2, the basic control operation described above is not affected by the monitor device.

Let now consider a case where the motor current $I_M$ reaches an excessive current by the commutation failure of the chopper CH or the like and the operation point of the magnetic amplifier MPS enters the remanent output region such as at a point Q in FIG. 2. In this case, the magnetic amplifier MPS assumes the current transformer operation so that an impedance of the control input circuit is sufficiently high and the output voltage across the load resistor $R_L$ when the control input is D.C. signal is a D.C. voltage a magnitude of which is substantially proportional to the control input, as shown in (2) of FIG. 3B.

When the output voltage $E_L$ is smaller than $E_{Z2}$, the voltages at the points $S_1$ and $S_2$ are zero and the transistor $T_{r2}$ is opened so that the trip coil TC is not energized.

When the output voltage $E_L$ meets the relation $E_{Z2} < E_L < E_{Z1}$, on the other hand, the transistor $T_{r1}$ is opened because the voltage at the point $S_1$ is zero but the transistor $T_{r2}$ is activated through the zener diode $D_{Z2}$ and the resistors $R_2$ and $R_3$ because of $E_{Z2} < E_L$ so that the trip coil TC is energized to open the circuit breaker CB.

Thus, when the motor current $I_M$ reaches an excessive current and the operation point of the magnetic amplifier MPS enters the remanent output region, the DC-like output appears across the load resistor $R_L$. When the magnitude of the D.C. output exceeds the zener voltage of the zener diode $D_{Z2}$, the circuit breaker CB is actuated to protect the motor circuit. The magnitude of the motor current $I_M$ at which the circuit breaker CB is actuated, that is, the excess current detection level can be adjusted by changing the zener voltage of the zener diode $D_{Z2}$.

Figure 3B:
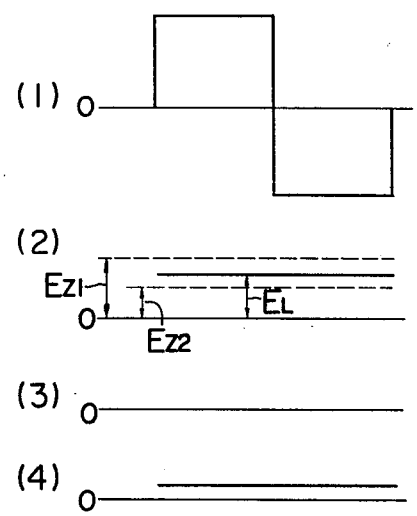
Figure 3C:
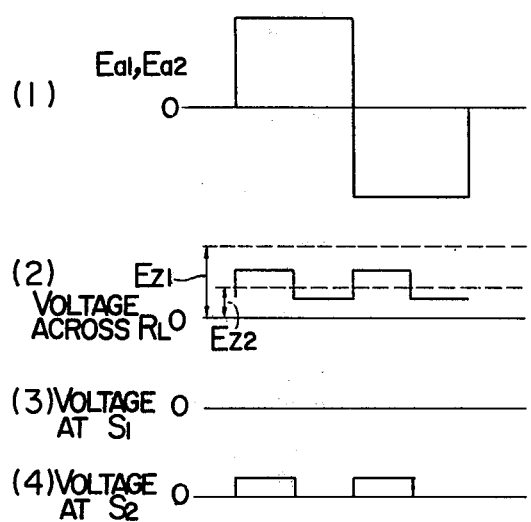

In FIGS. 3A to 3C, (1) shows voltage waveforms of the square A.C. power supplies $E_{a1}$, $E_{a2}$, (2) shows the voltage waveform across the load resistor $R_L$, (3) shows the voltage waveform at the point $S_1$ and (4) shows the voltage waveform at the point $S_2$.

According to the present embodiment, the excess motor current can be sensed for protection by merely adding simple components such as the zener diodes and the transistors to the output of the magnetic amplifier.

Figure 4:
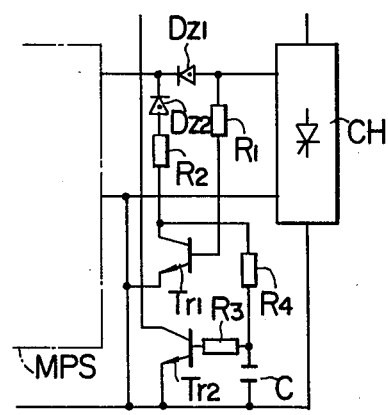
FIG. 4 shows a modification of the configuration of the embodiment shown in FIG. 1.

The case where the output of the magnetic amplifier is D.C. in the remanent output region has been described. In certain applications, it may not be possible to make the impedance of the control input circuit to be sufficiently high. In such a case, it has been known that the output voltage waveform across the load resistor $R_L$ includes ripple components even if the control input is D.C., as shown in (2) of FIG. 3C. In this case, the magnitude of a high voltage portion of the output voltage waveform changes linearly in proportion to the control input. Therefore, by setting the zener voltage of the zener diode $D_{Z2}$ to be lower than the magnitude of the high voltage portion, an output as shown in (4) of FIG. 3C is produced from the zener diode $D_{Z2}$. This output is converted to D.C. through a filter circuit comprising resistors $R_3$ and $R_4$ and a capacitor C as shown in FIG. 4 and the filtered D.C. is applied to the transistor $T_{r2}$. In this manner, the same effect and operation as that described in connection with FIG. 3B is attained without being affected by the ripple components.

The method described above is also applicable to a case where the output voltage of the magnetic amplifier MPS includes ripple components due to ripple components included in the motor current $I_M$.

While the embodiment shown in FIG. 1 uses the magnetic amplifier MPS having three control windings $N_{C1}$, $N_{C2}$ and $N_{C3}$, a magnetic amplifier having the single control winding $N_{C3}$ may be used in certain applications. Since the characteristic of the magnetic amplifier, in essence, is represented by a chain line in FIG. 2, the magnetic amplifier operates as if a command corresponding to $N_{C2}.I_B$ has been applied although the command current $I_P$ and the bias current $I_B$ are not applied. Thus, where severe control precision for the motor is not required, it may be sufficient to merely feed back the motor current. When it is desired to change the motor current, the number of turns of the control winding $N_{C3}$ may be changed.

While the embodiment shown in FIG. 1 illustrates the case where the motor M and the chopper CH are connected in series for power running control, the present invention is applicable as well to a case where the motor M and the chopper CH are connected in parallel for brake control.

FIG. 5 shows a configuration of another embodiment of the detecting system of the present invention, which is used for a field-weakening control of the motor M. In FIG. 5, the like symbols represent like parts to those shown in FIG. 1.

The difference of the present embodiment from the embodiment of FIG. 1 lies in that a series circuit of a resistor $R_W$ and a switch WFC is connected in parallel with the field F of the motor M and the transistor $T_{R2}$ is connected to energize an actuation coil of the switch WFC. Further, the directions of application of the command current $I_P$ and the motor current $I_M$ to the control windings $N_{C1}$ and $N_{C3}$, respectively, are opposite to those in FIG. 1.

In this arrangement, by properly adjusting the bias current $I_B$, the magnetic amplifier MPS exhibits such a characteristic that the duty angle $\alpha$ is maximum or the mean output voltage is maximum when the control input is zero. Since the command current $I_P$ and the motor current $I_M$ in the present embodiment are in opposite sense to those in the embodiment of FIG. 1, the command current $I_P$ functions to reduce the duty angle $\alpha$ while the motor current $I_M$ functions to increase the duty angle $\alpha$.

FIGS. 6A and 6B show charts for explaining the operation of the present embodiment. In FIG. 6B, (1) shows waveforms of the square A.C. power supplies $E_{a1}$, $E_{a2}$, (2) shows a voltage waveform at the point $S_1$, (3) shows an OFF signal for the chopper CH, and (4) shows an ON signal for the chopper CH.

As shown in FIG. 6B, in the present embodiment, the voltage at the point $S_1$, that is, the pulse voltage which is in synchronism with the rise of the voltage corresponding to the ON signal to the chopper CH in the embodiment of FIG. 1 is used as the OFF signal, and the pulse voltage which is in synchronism with the polarity reversal point of the square A.C. corresponding to the OFF signal to the chopper CH in the embodiment of FIG. 1 is used as the ON signal.

With this arrangement, the magnetic amplifier operates at the point P where the command magnetomotive force $N_{C1}.I_P$ and the feedback magnetromotive force $N_{C3}.I_P$ are substantially equal, and the motor current $I_M$ is automatically controlled to be proportional to the command current $I_P$, as in the embodiment of FIG. 1.

As the operation point moves to a point O', the chopper CH is fully opened, and as the operating point further moves, the motor current $I_M$ decreases and the speed of the motor M increases correspondingly. This is a so-called free acceleration state.

Where it is required to accelerate the motor to a higher speed because it is difficult to increase the speed under the free acceleration state, a so-called field-weakening control in which the current in the field F is branched is generally effected.

In the present embodiment, as the motor enters the free acceleration state and the motor current $I_M$ decreases, the operation point of the magnetic amplifier MPS moves to a point Q in FIG. 6A and enters the remanent output region. As described in connection with the embodiment of FIG. 1, the transistor $T_{r2}$ is then shorted at a predetermined level of the motor current $I_M$ so that the actuation coil of the switch WFC is energized to connect the resistor $R_W$ in parallel with the field F to effect the field weakening control.

According to the present embodiment, the reduction of the motor current is sensed for the field weakening control by merely adding simple components such as zener diodes and transistors.

While the embodiments illustrated above show the application where the current in the load controlled by the semiconductor device using thyristor is sensed, it is apparent that the present invention can be applied to the voltage sensing where the voltage across the load is converted to a current through a resistor and the resultant current is supplied to the control winding of the magnetic amplifier.

Furthermore, while the embodiments described above utilize the duty angle of the output of a magnetic amplifier to control a thyristor chopper, it is apparent that a similar current sensing to those in the illustrated embodiments can be attained in a control system using the magnetic amplifier which makes use of the mean output voltage for control purposes, by utilizing the remanent output region.

As described hereinabove, the present invention provides a detecting system having a function of sensing an output of a controllable semiconductor device with a simple construction.

We claim:

1. A system for detecting an output of a controllable semiconductor device comprising a controllable semiconductor device, a magnetic amplifier to which an output of said semiconductor device is fedback to control said semiconductor device, and a monitor means for monitoring an output of said magnetic amplifier and for determining that the output of said semiconductor device exceeds a predetermined level, when the output of said magnetic amplifier is in a remanent output region of said magnetic amplifier.

2. A system according to claim 1, wherein said monitor means includes at least two level setting elements for setting two levels so that said monitor means is activated when the output of said magnetic amplifier is between the two levels.

3. A system according to claim 1 wherein said magnetic amplifier receives a command and the output of said semiconductor device and said magnetic amplifier produces a control signal in accordance with a deviation between the command and the output of said semiconductor device.

4. A system according to claim 3 wherein said command is applied in a sense to increase a normal output of said magnetic amplifier.

5. A system according to claim 3 wherein said command is applied in a sense to increase a remanent output of said magnetic amplifier.

6. A system for detecting an output of a controllable semiconductor device comprising a power supply, a controllable semiconductor device connected to said power supply, a motor adapted to be controlled by said semiconductor device, a magnetic amplifier to which an output of said semiconductor device is fedback to control said semiconductor device, and a monitor means for monitoring an output of said magnetic amplifier and for determining that the output of said semiconductor device exceeds a predetermined level, when the output of said magnetic amplifier is in a remanent output region of said magnetic amplifier.

7. A system according to claim 6, wherein said monitor means includes at least two level setting elements for setting two levels so that said monitor means is activated when the output of said magnetic amplifier is between the two levels.

8. A system according to claim 6 wherein said monitor means, when activated, operates to isolate said semiconductor device from said power supply.

9. A system according to claim 6 wherein said monitor means, when activated, operates to control a field of said motor.

* * * * *